May 3, 1932.  J. W. LEDEBOER  1,856,570
CEMENT PRODUCT
Filed Aug. 29, 1930

INVENTOR
John W. Ledeboer
BY
Edwards Bower Pool
ATTORNEYS.

Patented May 3, 1932

1,856,570

UNITED STATES PATENT OFFICE

JOHN W. LEDEBOER, OF AMBLER, PENNSYLVANIA, ASSIGNOR TO AMBLER ASBESTOS SHINGLE & SHEATHING COMPANY, OF AMBLER, PENNSYLVANIA, A CORPORATION OF PENNSYLVANIA

CEMENT PRODUCT

Application filed August 29, 1930. Serial No. 478,772.

This invention relates to the production of sheets or slabs of cement and fibre composition.

The object of the invention is to provide a sheet or slab of cement fibre composition that will be compact, strong, and of even thickness and smooth surface.

A further object of the invention is to provide such a slab of large size and of desired thickness of accumulated laminations parallel to the general plane of the slab.

In the accompanying drawings illustrating the invention

Figure 1:
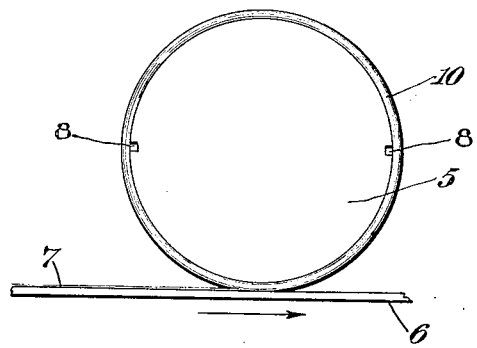
Figure 2:
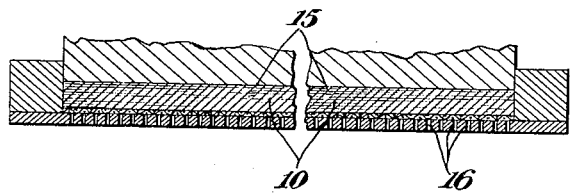

Fig. 1 is a sectional view illustrating the primary formation of the slab as a laminated cylindrical structure; and Fig. 2 is a sectional view illustrating the pressing of this slab to its final form.

In the specific embodiment illustrated in the drawings the accumulating roll 5 picks from the belt 6 a film or layer 7 of asbestos cement composition and winds this in generally cylindrical form to desired thickness, so that, for instance, the final slab will have a thickness of ¼" or ⅜" or more, depending on the size of the sheet. The asbestos cement composition is originally mixed in the form of a slurry with an excess of water, according to the Hatschek process and picked up therefrom as a film by rolls or cylinders which pass the wet film on to the belt 6 so that on the belt the film is in the form of a plastic cement with enmeshed fibres lying generally in the plane of the belt.

In the accumulated cylinder on roll 5, therefore, there is a laminated structure with the fibres enmeshed and matted and extending generally in the direction of the roll surface. This accumulated sheet is cut along groove 8 and flattened out to provide the flat laminated slab 10 of desired size, for instance 32" x 48", or 48" x 96", or the like.

To give the desired strength and compactness to the slab and to provide it with a smooth surface that is perfectly plane and flat, the slab or sheet immediately after formation and removal from the accumulating roll is subjected to pressure flatwise, and in such manner as to retain the contained water against escape on the surface to be finished flat while permitting escape of the contained water on the opposite surface.

The sheet or slab 10 is placed in a filter press having an upper platen surface 15 and lower filter bed 16 and pressed between these members under a pressure as high as 1,500 pounds per square inch for a short time varying up to one half a minute or even longer, according to the thickness of the sheet. This pressure forces the film laminations of the sheet together to compact the structure and at the same time presses out excess water through the lower surface in contact with the filter bed 16. This release of fluid at the filter surface permits the sheet material to accommodate itself very exactly and uniformly to the smooth impervious surface of the platen 15. All irregularities are thus compensated for; the pressure is evenly distributed without concentration at any area or point, and consequently, the entire sheet is flat and of uniform compactness along the smooth surface against the platen. This is of utmost importance in avoiding blemishes in the sheet surface. It has been found that no matter how carefully graded the materials are the inevitable irregularities attendant upon the accumulation of the laminations in practical operation will in prior pressing methods cause variations in contour or compactness at different parts of the surface giving slight undulations or a different texture, which will appear as blemishes even when there is a finishing coating applied to the surface of the sheet.

With the process of this invention, the wet laminated slab 10 is pressed against the smooth matrix surface 15 by the filter surface 16 which in its release of the fluids across lines normal to the laminations compensates for variations so as to give a greater release where there is greater pressure, and less release where there is less pressure. This obviates any tendency to the production of appreciably different compactnesses at different points, and permits the smooth surface of the sheet or slab to be absolutely true in direction and even in texture.

After pressing the slab is rigidly supported in flat form and permitted to set, the time of curing varying with conditions, but requiring preferably ten days or more before shipment. The final slab is of substantially uniform thickness and with a very accurately plane surface which is smooth in contour, varying less than 1° from a true plane, and homogeneous in texture, the other face being determined by the character of the surface of the filter bed 16. At the same time the fluid distribution of the fibres in a direction parallel to the plane of the sheet contributes great strength to the material and makes it compact and durable.

I claim:

1. The process of producing a slab or sheet comprising mixing fibre-cement composition in the form of a slurry and picking up a wet adhering film of fibre-cement from said slurry, accumulating a plurality of said films in face to face contact in a slab or sheet and with the enmeshed fibres extending in a direction parallel to said slab or sheet, subjecting said slab or sheet in plastic condition to pressure of an impervious surface on one face in a direction at right angles to the plane of said films, while retaining the fibre-cement and permitting escape of contained water on the opposite face, and then permitting said sheet or slab to set while supporting it against distortion.

2. An article of manufacture comprising a hardened slab or sheet built up of a series of separately formed parallel films of mixed fibre-cement forming a laminated structure with the fibres enmeshed and matted and extending generally in planes in the direction of the sheet or slab, said films being forced together under evenly distributed pressure to form an integral mass with one side of the sheet or slab having its surface films homogeneous in texture and pressed precisely smooth and regular and with the opposite side of the sheet formed by the release of water during said pressing.

JOHN W. LEDEBOER.